S. C. CARY.
DIVERGENT SAW TOOTH FASTENER.
APPLICATION FILED MAY 31, 1919.

1,328,911.

Patented Jan. 27, 1920.

Inventor
Spencer C. Cary
By his Attorney

UNITED STATES PATENT OFFICE.

SPENCER C. CARY, OF BROOKLYN, NEW YORK.

DIVERGENT SAW-TOOTH FASTENER.

1,328,911.　　　　　Specification of Letters Patent.　　Patented Jan. 27, 1920.

Application filed May 31, 1919. Serial No. 300,795.

*To all whom it may concern:*

Be it known that I, SPENCER C. CARY, a citizen of the United States, residing at the city of New York, borough of Brooklyn, county of Kings, and State of New York, have invented a certain new and useful Divergent Saw-Tooth Fastener, of which the following is a specification.

The invention is a divergent saw tooth fastener, the objects in view being to so improve the construction as to result in drawing together two pieces of wood or other material into which the fastener is adapted to be driven, and to impart to the penetrating edge of the fastener such formation as will insure the easy driving of the fastener either with or across the grain of the wood and with practically no tendency to deflection from a straight line in the driving operation.

The salient feature of my new fastener is the provision of a straight cutting edge intermediate the saw tooth edges on certain corrugations which are in divergent relation to a central plane member of the fastener, said straight cutting edge being in the medial plane of the fastener and in the same plane as the edges or points on the saw teeth.

More specifically stated, the divergent fastener of my invention comprises a single piece so formed as to produce a plane web piece the opposite side edges of which are in divergent relation so as to impart a flat wedge appearance thereto, the said web being provided with a straight cutting edge, and corrugations unitary with said web and parallel to the divergent side edges thereof, said corrugations being provided with saw teeth the edges of which are in alinement with the straight cutting edge of the wedge shaped web, the edges of the saw teeth and the cutting edge of the web lying in the medial plane of the fastener.

The new fastener is illustrated in the accompanying drawing, wherein—

The fastener embodies a central flat web A and corrugations B C, said web being intermediate the corrugations. The edges of the web at the sides thereof are inclined at $a$ $b$, so that the web is narrower at the driving edge than it is at the penetrating edge, the web having a wedge shaped appearance. The edge at the wide end of the web is beveled on the opposite faces of said web, producing a cutting edge $c$, the same being a straight edge of appreciable length.

The corrugations B C are made with the web in one piece of metal, the latter being bent and rebent to produce one, two or more corrugations at each side of the flat web. The corrugations B are parallel to the inclined edge $a$ of the web, whereas corrugations C are parallel to the inclined edge $b$, and thus the corrugations B C occupy a divergent relation to each other.

It is essential that the corrugations B C be provided with saw teeth, D, the points $d$ of which are in the plane of the medial line of the fastener.

The saw tooth formation is produced upon the corrugations in accordance with certain swaging, notching or cutting out, and tooth alining processes disclosed in certain prior patents and applications for patents to which I am a party; but it may be stated, briefly, that such teeth are formed by first swaging the convex portions of the corrugations to produce bevels $e$ at the penetrating edge, then notching or cutting to remove a certain part of the metal in the swaged portions for the formation of the saw teeth and simultaneously with such notching operations the cutting dies produce bevels $f$ in the concave portions of the corrugations, at the bases of the teeth, and the points of said teeth are sharpened by other swaging dies the latter performing the additional function of alining said points in the plane of the medial line of the fastener. It may be added that prior to the first swaging operation the flat metal stock is or may be ground on the penetrating edge for the purpose of preliminarily removing some of the metal, thus reducing the quantity of the metal required to be removed by the swaging and cutting dies in the notching or cutting operation.

Figure 1:
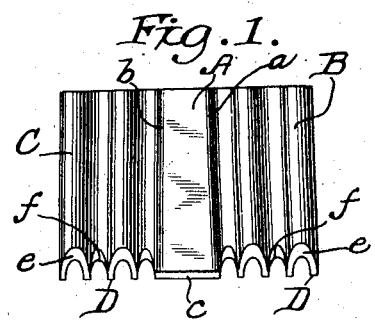
Figure 1 is a side elevation, on an enlarged scale, of the divergent fastener.
Figure 2:
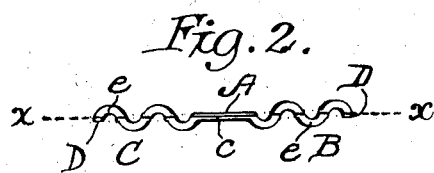
Fig. 2 is a view looking at the penetrating edge of the fastener.

My fastener is characterized by the use of a straight cutting edge between a plurality of saw teeth on the penetrating edge of the fastener, said straight cutting edge lying in the same plane as the points of the saw teeth, the cutting edge described and the points of the saw teeth being alined and lying in the medial plane of the corrugations and the flat web, the medial line of the fastener, i. e. that line midway between the crests of the corrugations, being indicated by the dotted line X X of Fig. 2.

A further structural feature is a flat web intermediate adjacent corrugations, the side edges of the web being divergent and the oppositely located corrugations being parallel, respectively, to said divergent edges of the web; said web being provided with a straight cutting edge positioned between and in alinement with the points of saw teeth which are provided on the corrugations at the penetrating edge of the fastener.

Figure 3:
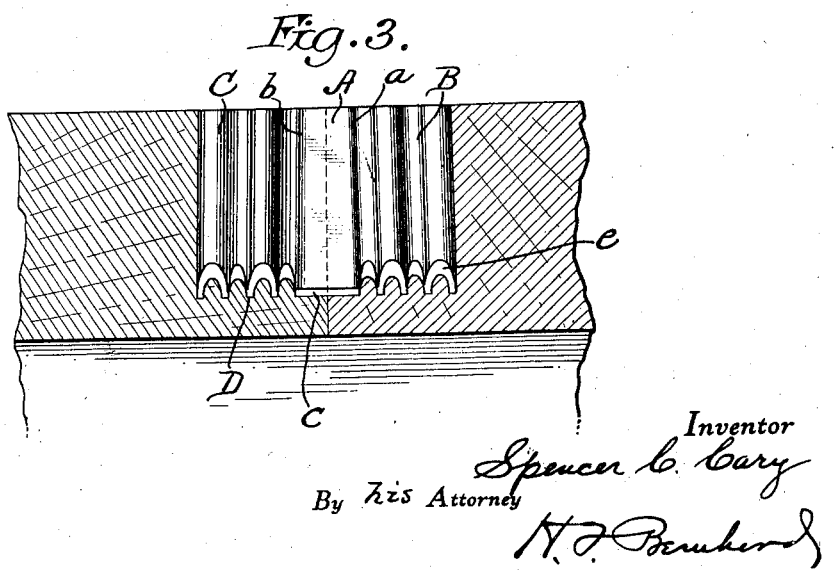
Fig. 3 is a view partly in elevation and partly in section illustrating the fastener driven into the wood or other material.

The saw teeth and the cutting edge enable the fastener to penetrate the material and they cut through the same, so that the fastener drives easily and cuts its way cleanly through the wood, either with or across the grain. The saw tooth formation acts with a draw shear cut on the wood and the divergent relation of the corrugations imparts to the fastener a characteristic action in drawing together two pieces of wood, or other material, so that the pieces are drawn into forcible contact by the act of driving the fastener, as shown in Fig. 3. It will be noted that the flat wedge shaped web is intermediate the divergent corrugations, and in the operation of driving the fastener the straight cutting edge of this flat web penetrates the material easily and cleanly without unnecessary crowding of the fibers, the effect of which is to give to the divergent corrugations a better opportunity of drawing together the separate pieces of material into which the fastener is driven.

Having thus fully described the invention, what I claim as new, and desire to secure by Letters Patent is:—

1. A divergent saw tooth fastener embodying a flat web and corrugations at the respective sides of the web and in divergent relation to each other, said corrugations being provided with saw teeth and said web having a straight cutting edge positioned intermediate the saw teeth and in alinement therewith, said straight cutting edge and the points of the saw teeth lying in the medial plane of the fastener.

2. A divergent saw tooth fastener embodying a flat web the side edges of which are inclined, and corrugations parallel to the inclined edges at the respective sides of the web and having a divergent relation to each other, said corrugations being provided with saw teeth and said web having a straight cutting edge intermediate said saw teeth, the points of the saw teeth and the cutting edge of the web being in alinement with each other and lying in the medial plane of the fastener.

3. A divergent saw tooth fastener embodying a flat web the side edges of which are inclined and the penetrating edge of which is beveled to produce a straight cutting edge of appreciable length, and a plurality of corrugations at the respective sides of the web and parallel to the inclined edges thereof, said corrugations being provided with saw teeth the concave portions of which at the bases thereof are beveled, said cutting edge of the web being alined with cutting edges at the points of the teeth and said cutting edges of the web and the cutting edges at the points of the teeth lying in the medial plane of the fastener.

In testimony whereof I have subscribed my name hereto.

SPENCER C. CARY.